(12) United States Patent
Moriguchi et al.

(10) Patent No.: US 8,938,960 B2
(45) Date of Patent: Jan. 27, 2015

(54) CONTROL APPARATUS FOR INTERNAL COMBUSTION ENGINE

(75) Inventors: Ryutaro Moriguchi, Susono (JP); Satoru Tanaka, Susono (JP); Machiko Katsumata, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/883,449

(22) PCT Filed: Nov. 5, 2010

(86) PCT No.: PCT/JP2010/069670
§ 371 (c)(1),
(2), (4) Date: May 3, 2013

(87) PCT Pub. No.: WO2012/060006
PCT Pub. Date: May 10, 2012

(65) Prior Publication Data
US 2013/0219881 A1    Aug. 29, 2013

(51) Int. Cl.
*F02D 23/00* (2006.01)
*G06F 7/00* (2006.01)
*G06F 17/00* (2006.01)
*F02D 23/02* (2006.01)
*F02B 37/18* (2006.01)
*F02D 41/00* (2006.01)
*F02D 41/14* (2006.01)
*F02B 37/12* (2006.01)

(52) U.S. Cl.
CPC .............. *F02D 23/02* (2013.01); *F02B 37/18* (2013.01); *F02D 41/0007* (2013.01); *F02D 41/1445* (2013.01); *F02D 2041/1433* (2013.01); *F02D 2200/0402* (2013.01); *Y02T 10/144* (2013.01); *F02B 2037/122* (2013.01)
USPC ................ 60/602; 60/600; 701/103; 701/104

(58) Field of Classification Search
USPC ............................ 60/600, 602; 701/102, 103
See application file for complete search history.

(56) References Cited

U.S. PATENT DOCUMENTS

| | | | |
|---|---|---|---|
| 4,424,675 A * | 1/1984 | Ojima | 60/602 |
| 7,775,043 B2 * | 8/2010 | Funke et al. | 60/602 |
| 7,908,858 B2 * | 3/2011 | Gehrke et al. | 60/602 |
| 2005/0172628 A1 | 8/2005 | Fukasawa et al. | |
| 2009/0013688 A1 * | 1/2009 | Panciroli | 60/602 |
| 2011/0213539 A1 * | 9/2011 | Eiraku | 701/102 |

FOREIGN PATENT DOCUMENTS

| | | |
|---|---|---|
| EP | 1 004 760 A2 | 5/2000 |
| JP | 10-077912 A | 3/1998 |

(Continued)

*Primary Examiner* — Thai Ba Trieu
*Assistant Examiner* — Ngoc T Nguyen
(74) *Attorney, Agent, or Firm* — Kenyon & Kenyon LLP (57) ABSTRACT

A control apparatus for an internal combustion engine is provided that is capable of calculating a high-accuracy turbine rotational speed. A turbo supercharger which includes, in an exhaust passage, a turbine that is operated by exhaust energy of the internal combustion engine. A turbine rotational speed model which calculates a turbine rotational speed. The turbine rotational speed is corrected by an exhaust energy correction part equipped with the turbine rotational speed model.

4 Claims, 8 Drawing Sheets

(56) References Cited

FOREIGN PATENT DOCUMENTS

| JP | 2000-220462 A | 8/2000 |
| JP | 2005-155384 A | 6/2005 |
| JP | 2006-022763 A | 1/2006 |
| JP | 2008-274797 A | 11/2008 |
| JP | 2008-309004 A | 12/2008 |
| JP | 2009-287409 A | 12/2009 |
| JP | 4952848 B2 | 6/2012 |

* cited by examiner

*1: Ignition timing correction amount calculation part
*2: VVT correction amount calculation part
*3: A/F correction amount calculation part

*1: Ignition timing correction amount calculation part
*2: VVT correction amount calculation part
*3: A/F correction amount calculation part

CONTROL APPARATUS FOR INTERNAL COMBUSTION ENGINE

This is a 371 national phase application of PCT/JP2010/069670 filed 5 Nov. 2010, the contents of which are incorporated herein by reference.

TECHNICAL FIELD

The present invention relates to a control apparatus for an internal combustion engine, and more particular to a control apparatus for an internal combustion engine that includes a turbo supercharger.

BACKGROUND ART

So far, for example, Patent Document 1 discloses a control apparatus for an internal combustion engine that includes a turbo supercharger. According to the conventional control apparatus, the turbo supercharger is modeled for each constituent element, and, a turbine model, a shaft model and a compressor model are established.

Including the above described document, the applicant is aware of the following documents as related art of the present invention.

CITATION LIST

Patent Documents

Patent Document 1: Japanese Laid-open Patent Application Publication No. 2006-22763
Patent Document 2: Japanese Laid-open Patent Application Publication No. 2008-309004
Patent Document 3: Japanese Laid-open Patent Application Publication No. 2008-274797
Patent Document 4: Japanese Laid-open Patent Application Publication No. 2000-220462

SUMMARY OF INVENTION

Technical Problem

A turbine rotational speed (turbo rotational speed) of a turbo supercharger changes with a change in exhaust energy that is supplied to a turbine. Therefore, if the change in the exhaust energy is not taken into consideration in a case in which a system for calculating the turbine rotational speed is built, a problem is posed in that the calculation accuracy of the turbine rotational speed is deteriorated.

The present invention has been made to solve the problem as described above, and has its object to provide a control apparatus for an internal combustion engine that is capable of calculating a high-accuracy turbine rotational speed in the internal combustion engine having a turbo supercharger.

Solution to Problem

A first aspect of the present invention is a control apparatus for an internal combustion engine, comprising:
a turbo supercharger which includes, in an exhaust passage, a turbine that is operated by exhaust energy of an internal combustion engine;
turbine rotational speed calculation means for calculating a turbine rotational speed of the turbine; and
rotational speed correction means for correcting, based on at least one of an ignition timing, an opening timing and/or an closing timing of an intake valve and/or an exhaust valve, and an air fuel ratio, the turbine rotational speed calculated by the turbine rotational speed calculation means.

A second aspect of the present invention is the control apparatus for an internal combustion engine according to the first aspect of the present invention,
wherein the internal combustion engine further includes:
an exhaust bypass passage which bypasses the turbine; and
a waste gate valve which opens and closes the exhaust bypass passage,
wherein the control apparatus for the internal combustion engine further comprises:
WGV state quantity obtaining means for obtaining a WGV state quantity that represents an opening and closing state of the waste gate valve; and
rotational speed maintenance flow rate calculation means which has a relation information that defines, based on a relation between the turbine rotational speed and the WGV state quantity, a turbine rotational speed maintenance flow rate necessary for maintaining a current turbine rotational speed, and for calculating the turbine rotational speed maintenance flow rate in accordance with the relation information,
wherein the rotational speed correction means is a means for correcting the turbine rotational speed used for basis of calculation of the turbine rotational speed maintenance flow rate.

A third aspect of the present invention is the control apparatus for an internal combustion engine according to the second aspect of the present invention,
wherein the control apparatus for the internal combustion engine further includes:
exhaust gas flow rate obtaining means for obtaining an flow rate of exhaust gas discharged from a cylinder of the internal combustion engine;
flow rate change amount calculation means for calculating a turbine flow rate change amount that is an difference between the flow rate of exhaust gas and the turbine rotational speed maintenance flow rate; and
rotational speed change amount calculation means for calculating a turbine rotational speed change amount, based on the turbine flow rate change amount calculated by the flow rate change amount calculation means,
wherein the rotational speed change amount calculation means is a means for calculating the turbine rotational speed at a current calculation cycle, based on the turbine rotational speed change amount calculated at the current calculation cycle and the turbine rotational speed calculated at a last calculation cycle.

A fourth aspect of the present invention is the control apparatus for an internal combustion engine according to the first aspect of the present invention,
wherein the internal combustion engine further includes:
an exhaust bypass passage which bypasses the turbine; and
a waste gate valve which opens and closes the exhaust bypass passage,
wherein the control apparatus for the internal combustion engine further comprises:
exhaust gas flow rate obtaining means for obtaining an flow rate of exhaust gas discharged from a cylinder of the internal combustion engine; and
WGV state quantity obtaining means for obtaining a WGV state quantity that represents an opening and closing state of the waste gate valve,
wherein the rotational speed calculation means is a means which has a relation information which defines, based on a relation between the flow rate of exhaust gas and the WGV state quantity, a steady turbine rotational speed that is the turbine rotational speed at a steady state, and for calculating the steady turbine rotational speed in accordance with the relation information, and wherein the rotational speed correction means is a means for correcting the steady turbine rotational speed calculated in accordance with the relation information.

A fifth aspect of the present invention is the control apparatus for an internal combustion engine according to any one of according to any one of the first to fourth aspects of the present invention, wherein the waste gate valve is a valve which opens and closes by a diaphragm pressure acting on a diaphragm that operates simultaneously with the waste gate valve, wherein the WGV state quantity is the diaphragm pressure, and wherein the WGV state quantity obtaining means is a means for detecting or estimating the diaphragm pressure.

Advantageous Effects of Invention

According to the first aspect of the present invention, a high-accuracy turbine rotational speed can be calculated while taking into consideration an influence of a change in the exhaust energy.

According to the second aspect of the present invention, correction for the turbine rotational speed that is used for basis of calculation of the turbine rotational speed maintenance flow rate is executed while taking into consideration an influence of a change in the exhaust energy. Thus, the turbine rotational speed maintenance flow rate can be obtained that has taken into consideration influences of the exhaust energy and the WGV state quantity, and therefore, this allows, for example, a transitional turbine rotational speed to be estimated.

According to the third aspect of the present invention, a high-accuracy turbine rotational speed can be calculated that has taken into consideration influences of the exhaust energy and the WGV state quantity, in a system in which the turbine rotational speed change amount is calculated from the turbine flow rate change amount that is the difference between the exhaust gas flow rate and the aforementioned turbine rotational speed maintenance flow rate, and the current turbine rotational speed is calculated on the basis of the current turbine rotational speed change amount and the last turbine rotational speed.

According to the fourth aspect of the present invention, a high-accuracy steady turbine rotational speed can be calculated that has taken into consideration influences of the exhaust energy and the WGV state quantity.

According to the fifth aspect of the present invention, the influence of the WGV state quantity can be successfully reflected on the calculation of the turbine rotational speed by using, as the WGV state quantity, not the WGV opening degree that is difficult to measure in an actual internal combustion engine but the aforementioned diaphragm pressure.

DESCRIPTION OF EMBODIMENTS

First Embodiment

Explanation of System Configuration

Figure 1:
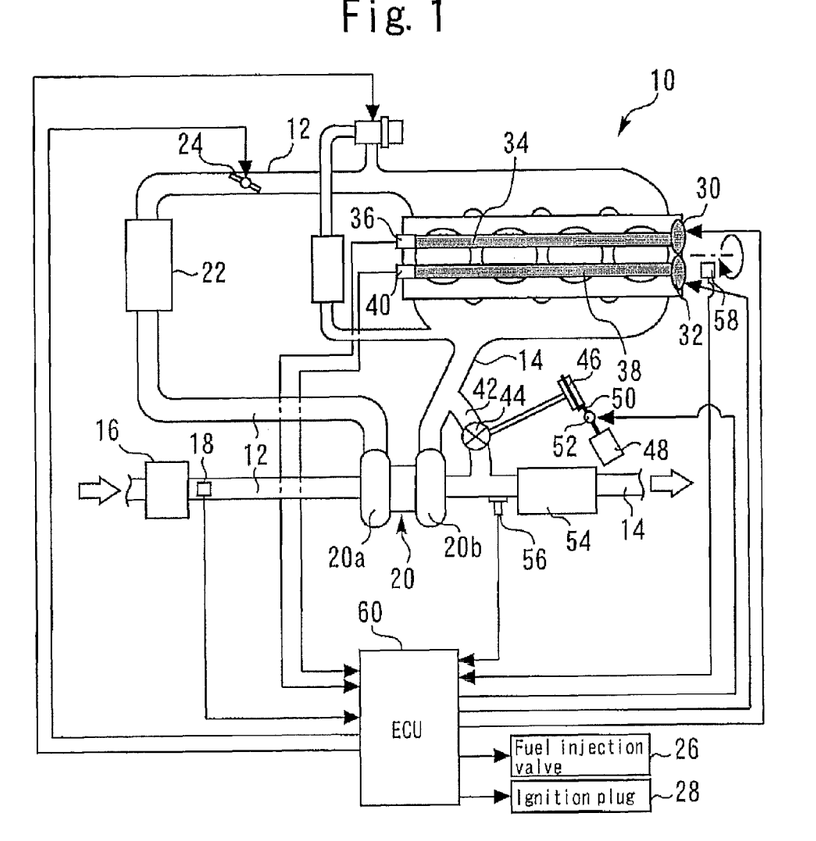
FIG. 1 is a schematic diagram for illustrating a system configuration of an internal combustion engine according to a first embodiment of the present invention.

FIG. 1 is a schematic diagram for illustrating a system configuration of an internal combustion engine 10 according to a first embodiment of the present invention. The system of the present embodiment includes a spark ignition type internal combustion engine (gasoline engine) 10. An intake passage 12 and an exhaust passage 14 are in communication with each cylinder of the internal combustion engine 10.

An air cleaner 16 is disposed at a position near an inlet of the intake passage 12. An air flow meter 18 is disposed near a downstream position of the air cleaner 16. The air flow meter 18 outputs a signal according to a flow rate of air drawn into the intake passage 12. A compressor 20a of a turbo supercharger 20 is disposed downstream of the air flow meter 18. The compressor 20a is integrally connected, via a coupling shaft, to a turbine 20b disposed in the exhaust passage 14.

An intercooler 22 that cools compressed air is disposed downstream of the compressor 20a. An electronically controlled throttle valve 24 is disposed downstream of the intercooler 22. Each cylinder of the internal combustion engine 10 includes a fuel injection valve 26 for injecting fuel into an intake port. Each cylinder of the internal combustion engine 10 further includes an ignition plug 28 for igniting a mixture gas.

In addition, the internal combustion engine 10 includes an intake variable valve operating mechanism 30 and an exhaust variable valve operating mechanism 32 that are driven to open and close an intake valve (not shown) and an exhaust valve (not shown), respectively. It is assumed herein that these variable valve operating mechanisms 30 and 32 are mechanisms capable of changing opening and closing timing of the intake valve or the exhaust valve. Although the concrete configuration to implement such variable valve operating mechanisms 30 and 32 is not specifically limited, a phase variable mechanism (VVT (Variable Valve Timing) mechanism) (not shown), for example, can be used that is capable of changing the opening and closing timing of the intake valve or the exhaust valve by changing the rotational phases of camshafts 34 and 36 with respect to the rotational phases of a crankshaft (not shown). In addition, an intake cam angle sensor 36 for detecting the rotational position (advance angle amount) of the intake camshaft 34 is installed in the vicinity of the intake variable valve operating mechanism 30, and an exhaust cam angle sensor 40 for detecting the rotational position (advance angle amount) of the exhaust camshaft 38 is installed in the vicinity of the exhaust variable valve operating mechanism 32.

Further, there is connected to the exhaust passage 14, an exhaust bypass passage 42 that bypasses the turbine 20*b* and connects an inlet side and an outlet side of the turbine 20*b*. A waste gate valve (WGV) 44 that opens and closes the exhaust bypass passage 42 is installed halfway through the exhaust bypass passage 42. The opening degree of the WGV 44 is controlled by a pressure-regulated actuator 46.

More specifically, a diaphragm (not shown) that operates simultaneously with the WGV 44 is provided inside the actuator 46. Negative pressure generated by a negative pressure pump 48 is supplied, via a negative pressure passage 50, to one of pressure chambers not shown) that are divided into two parts by the diaphragm. A vacuum switching valve (VSV) 52 for opening and closing the negative pressure passage 50 is installed halfway through the negative pressure passage 50. In addition, the diaphragm is urged in a direction to open the WGV 44 by a spring (not shown). According to such a configuration, the negative pressure supplied to the diaphragm is adjusted by driving the VSV 52 with an arbitrary duty ratio, and thereby, the opening degree of the WGV 44 can be adjusted. In this connection, the waste gate valve is not necessary to be a pressure-regulated valve and may, for example, be an electrically controlled valve.

Further, a catalyst 54 for purifying exhaust gas is disposed in the exhaust passage 14 at the downstream side of the turbine 20*b*. An A/F sensor 56 for detecting air fuel ratio of exhaust gas is disposed upstream of the catalyst 54. In addition, a crank angle sensor 58 for detecting an engine speed is installed in the vicinity of the crankshaft.

The system shown in FIG. 1 further includes an ECU (electronic control unit) 60. There are connected to an input section of the ECU 60, various types of sensors for detecting an operating state of the internal combustion engine 10, such as, the air flow meter 18, the cam angle sensors 36 and 40, the A/F sensor 56, and the crank angle sensor 58 that are described above. In addition, there are connected to an output section of the ECU 60, various types of actuators for controlling the operating state of the internal combustion engine 10, such as, the throttle valve 24, the fuel injection valve 26, the ignition plug 28, the variable valve operating mechanisms 30 and 32, and the VSV 52 that are described above.

[Configuration of Turbine Rotational Speed Model]

Figure 2:
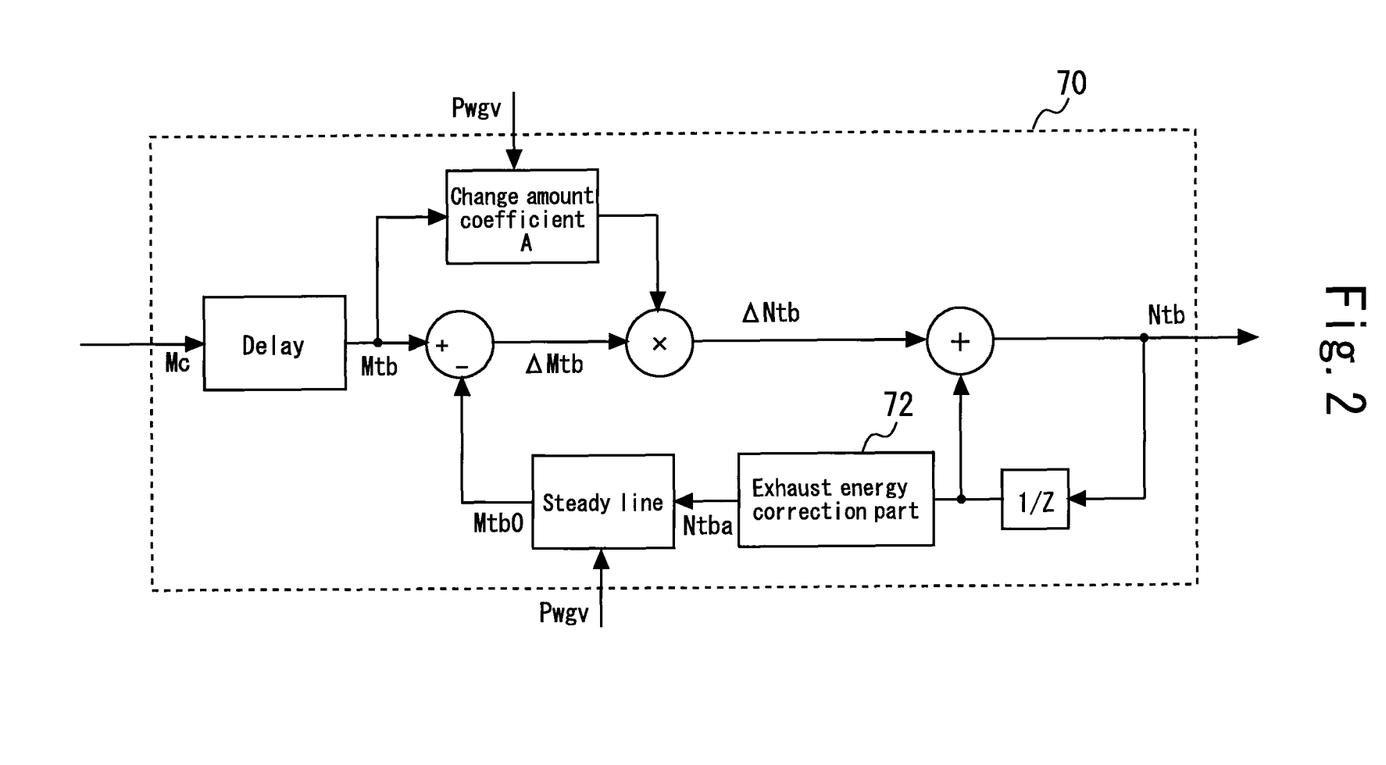
FIG. 2 is a block diagram showing a configuration of a turbine rotational speed model located within the ECU shown in FIG. 1.

FIG. 2 is a block diagram showing a configuration of a turbine rotational speed model 70 located within the ECU 60 shown in FIG. 1.

The turbine rotational speed model 70 having a configuration shown in FIG. 2 is virtually built inside the ECU 60 described above. The turbine rotational speed model 70 is a model that is capable of estimating a transitional turbine rotational speed (turbo rotational speed) Ntb that varies with a transitional change of the operating state of the internal combustion engine 10 (more specifically, a change in flow rate of a gas that passes around the intake valve (hereinafter, referred to as an "intake valve flow rate").

As shown in FIG. 2, the intake valve flow rate Mc is input to the turbine rotational speed model 70. The intake valve flow rate Mc is a value that can be obtained by use of the output of the air flow meter 19. The intake valve flow rate Mc input to the turbine rotational speed model 70 is converted into an exhaust gas flow rate Mtb in consideration of a time delay until the gas passing around the intake valve is exhausted into the exhaust passage 14. In this connection, the exhaust gas flow rate Mtb herein strictly refers to the flow rate of exhaust gas in the exhaust passage 14 at the upstream side of a point at which the exhaust passage 14 connects with the exhaust bypass passage 42 at the upstream side of the turbine 20*b*.

Figure 3:
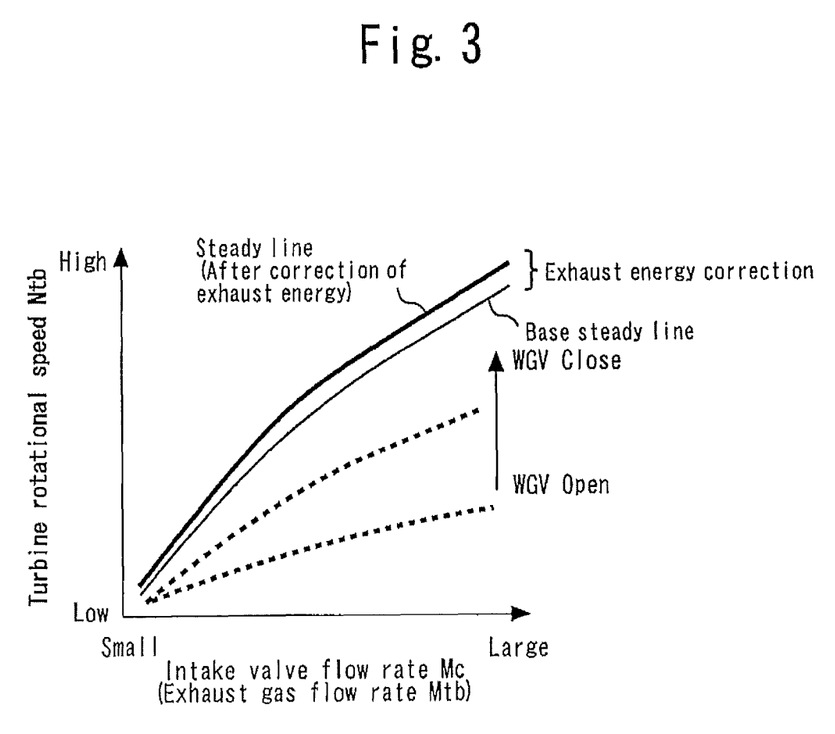
FIG. 3 is a diagram showing steady lines that define a relation at a steady state among a turbine rotational speed Ntb, a WGV state quantity that represents an opening and closing state of a WGV, and an intake valve flow rate Mc.

FIG. 3 is a diagram showing steady lines that define a relation at a steady state among the turbine rotational speed Ntb, a WGV state quantity that represents an opening and closing state of the WGV 44, and the intake valve flow rate Mc.

There is a correlation between the turbine rotational speed Ntb and the intake valve flow rate Mc (=the exhaust gas flow rate Mtb), and the relation between them at the steady state can be represented by a relation information as shown in FIG. 3 (hereinafter, referred to as the "steady line"), with the WGV state quantity (in FIG. 3, the WGV opening degree) as a parameter.

More specifically, under a situation in which the WGV state quantities are equal, the turbine rotational speed Ntb becomes higher as the intake valve flow rate Mc (exhaust gas flow rate Mtb) increases. In addition, if the WGV 44 is opened, out of the exhaust gas flow rate Mtb, the flow rate of gas flowing through the exhaust bypass passage 42, becomes larger, and therefore, the flow rate of gas flowing through the turbine 20*b* (hereinafter, referred to as a "turbine flow rate" in some cases) becomes smaller. Because of this, when the WGV 44 is opened, as shown in FIG. 3, the turbine rotational speed Ntb (steady turbine rotational speed Ntbs) decreases as compared with a case in which the WGV 44 is closed.

Moreover, if exhaust energy that is supplied to the turbine 30*b* varies, the turbine rotational speed Ntb changes, and therefore, the steady line changes as shown in FIG. 3. More specifically, FIG. 3 represents an example of a case in which the exhaust energy has increased. In the present embodiment, as described later with reference to FIG. 4, an exhaust energy correction part 72 takes into consideration changes in the ignition timing, the opening and closing timings of the intake and exhaust valves (including a valve overlap period), and the air fuel ratio (including information concerning fuel cut), as a change in the exhaust energy described above. In this connection, in the turbine rotational speed model 70, a steady line in a predetermined base condition (more specifically, a condition in which the ignition timing is a base ignition timing described later, the intake opening and closing timing InVT and the exhaust opening and closing timing ExVT are predetermined intake base opening and closing timing InVT0 and exhaust base opening and closing timing ExVT0 by which the valve overlap period becomes zero, and the air fuel ratio is a stoichiometric air fuel ratio) is included as a base steady line. In addition, the turbine rotational speed model 70 includes the base steady lines in accordance with the WGV state quantity (in the example in FIG. 3, the WGV opening degree).

Further, according to the exhaust energy correction part 72 of the turbine rotational speed model 70, the turbine rotational speed Ntb at the last calculation cycle (that is, a cycle before one step) that is obtained by the utilization of a lag element "1/Z" is corrected to an exhaust energy correction turbine rotational speed (hereinafter, simply referred to as a "correction turbine rotational speed") Ntba. Then, in the turbine rotational speed model 70, the correction turbine rotational speed Ntba is input to a steady line (base steady line).

As the WGV state quantity that is used for the steady line, a diaphragm pressure Pwgv (a state quantity) for controlling the WGV 44 is herein used, instead of the WGV opening degree (another state quantity) that is difficult to measure in an actual internal combustion engine. Although described later with reference to FIG. 4, the steady line for the turbine rotational speed Ntb and the intake valve flow rate Mc (exhaust gas flow rate Mtb) is obtained also by using the relation with the diaphragm pressure Pwgv. A change in the WGV opening degree in association with a change in the diaphragm pressure Pwgv has a time delay, and therefore, the diaphragm pressure Pwgv is herein used while taking into consideration this delay as a first order lag. In this connection, for example, the diaphragm pressure Pwgv may be estimated in accordance with a map (not shown) that is set in advance using a relation with a duty ratio for controlling the VSV 52, or may be measured by means of a pressure sensor separately installed.

Further, according to the turbine rotational speed model 70, it is assumed that the aforementioned steady lines are stored in the ECU 60 as a map that defines a turbine rotational speed maintenance flow rate Mtb0 on the basis of the relation between the turbine rotational speed Ntb and the diaphragm pressure Pwgv. However, the aforementioned steady lines (relation information in the present invention) is not limited to the one that is stored as such a map, and may, for example, be the one that is stored in the ECU 60 as a predetermined relational expression.

Furthermore, according to the turbine rotational speed model 70, a turbine flow rate change amount ΔMtb is calculated that is the difference between the aforementioned exhaust gas flow rate Mtb and the turbine rotational speed maintenance flow rate Mtb0 necessary to constantly maintain the current turbine rotational speed Ntb. It is conceivable that this turbine flow rate change amount ΔMtb relates to an energy for increasing or decreasing the rotational speed of the turbine 20b. More specifically, when the turbine flow rate change amount ΔMtb is positive, that is, when the current exhaust gas flow rate Mtb is greater than the turbine rotational speed maintenance flow rate Mtb0, the turbine rotational speed Ntb increases. On the other hand, when the turbine flow rate change amount ΔMtb is negative, that is, when the current exhaust gas flow rate Mtb is smaller than the turbine rotational speed maintenance flow rate Mtb0, the turbine rotational speed Ntb decreases.

Accordingly, according to the turbine rotational speed model 70, a turbine rotational speed change amount ΔNtb that is a change amount of the turbine rotational speed Ntb in accordance with the turbine flow rate change amount ΔMtb is calculated by multiplying the aforementioned turbine flow rate change amount ΔMtb by a predetermined change amount coefficient A. The change amount coefficient A is a value that is set in advance using a relation between the exhaust gas flow rate Mtb and the diaphragm pressure Pwgv (that is treated as a first order lag as in the case of the aforementioned steady line). Using such a change amount coefficient A allows the turbine rotational speed change amount ΔNtb to be calculated from the turbine flow rate change amount ΔMtb while taking into consideration influences of the exhaust gas flow rate Mtb and the diaphragm pressure Pwgv. Further, according to the turbine rotational speed model 70, the turbine rotational speed Ntb at the current calculation cycle is calculated by adding the turbine rotational speed change amount ΔNtb as calculated above to the turbine rotational speed Ntb calculated at the last calculation cycle (before one step).

According to the turbine rotational speed model 70 described so far, in a case in which the operating state of the internal combustion engine 10 is changing, a transitional turbine rotational speed Ntb can be sequentially calculated by sequentially inputting the intake valve flow rate Mc (exhaust gas flow rate Mtb) and the diaphragm pressure Pwgv that vary from moment to moment. In addition, at the steady state in which the operating state of the internal combustion engine 10 does not change, the turbine flow rate change amount ΔMtb becomes zero, and therefore, the turbine rotational speed change amount ΔNtb also becomes zero. Because of this, the turbine rotational speed Ntb converges with a value in accordance with the current exhaust gas flow rate Mtb and the WGV state quantity. In other words, according to the aforementioned turbine rotational speed model 70, the calculation of the turbine rotational speed Ntb at the steady state can be also ensured.

[Setting of Diaphragm Pressure Pwgv]

Figure 4:
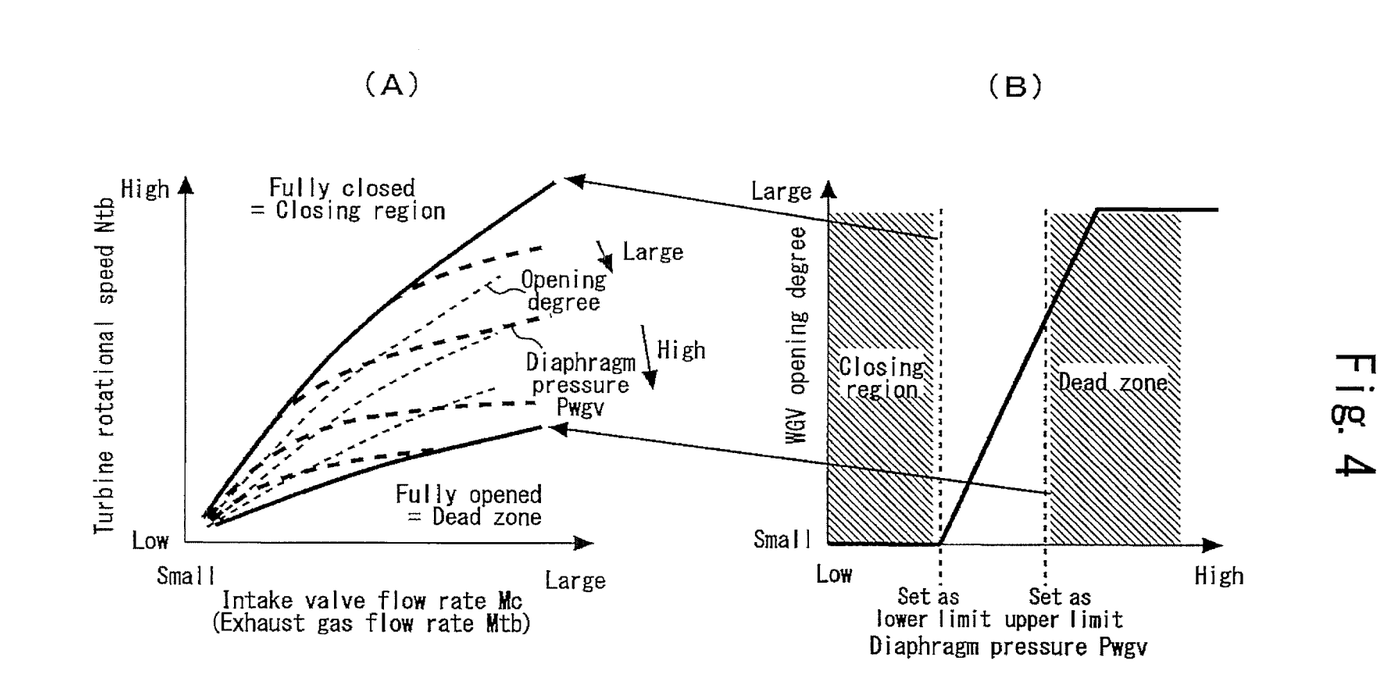
FIG. 4 is a diagram for explaining the setting of a diaphragm pressure Pwgv.

FIG. 4 is a diagram for explaining the setting of the diaphragm pressure Pwgv.

As shown in FIG. 4(A), the steady line that defines the relation between the turbine rotational speed Ntb and the intake valve flow rate Mc (exhaust gas flow rate Mtb) can be obtained also by using the relation with the diaphragm pressure Pwgv. As already described, the actuator 46 used in the present embodiment is configured as one example so that a force to close the WGV 44 becomes stronger as a negative diaphragm pressure Pwgv becomes higher. In order to maintain the WGV 44 in the fully closed state by means of the actuator 46, it is required to secure a force to close the WGV 44 while resisting the urging force of the aforementioned spring and a force to close the WGV 44 while resisting an exhaust pressure acted on the WGV 44. Thus, as the diaphragm pressure Pwgv becomes higher (negative pressure becomes smaller), the WGV 44 starts to open as shown in FIG. 4(A) under a condition in which the intake valve flow rate Mc is smaller (a condition on a lower load side) due to the fact that a force to close the WGV 44 by the actuator 46 weakens.

Here, the "closing region" in FIG. 4(B) is a region in which the WGV opening degree does not change in accordance with a change in the diaphragm pressure Pwgv, and the "dead zone" is a region in which the turbine rotational speed Ntb (turbine flow rate) does not change in accordance with a change in the WGV opening degree. In the present embodiment, on the basis of a data obtained in advance by experiment or the like, an upper limit in the aforementioned closing region is used as a lower limit (a value for judging that the WGV 44 is fully closed) of the diaphragm pressure Pwgv that is used as an input of the aforementioned steady line, as shown in FIG. 4(B). In addition, a lower limit (a value for judging that the flow rate of exhaust gas flowing through the exhaust bypass passage 42 is the largest) in the aforementioned dead zone is used as an upper limit of the diaphragm pressure Pwgv that is used as an input of the aforementioned steady line, as shown in FIG. 4(B).

Unlike the aforementioned settings of the upper and lower limits of the diaphragm pressure Pwgv, if, for example, a value (for example, 20 kPa) that is low with enough margin with respect to the upper limit in the closing region is set as the lower limit of the diaphragm pressure Pwgv, it is conceivable that the turbine rotational speed maintenance flow rate Mtb0 may be erroneously calculated, as a value when the WGV 44 is open, by interpolating the value along the steady line (map), even when the diaphragm pressure Pwgv is a value (for example, 40 kPa) in a state in which the WGV 44 actually can be fully closed. In contrast to this, according to the aforementioned settings, an accurate turbine rotational speed maintenance flow rate Mtb0 in accordance with a value of the diaphragm pressure Pwgv can be calculated without such an adverse effect, while taking into consideration the opening and closing characteristics. As a result of this, the accuracy of the turbine rotational speed model 70 can be successfully ensured.

(As to Exhaust Energy Correction Part)

Figure 5:
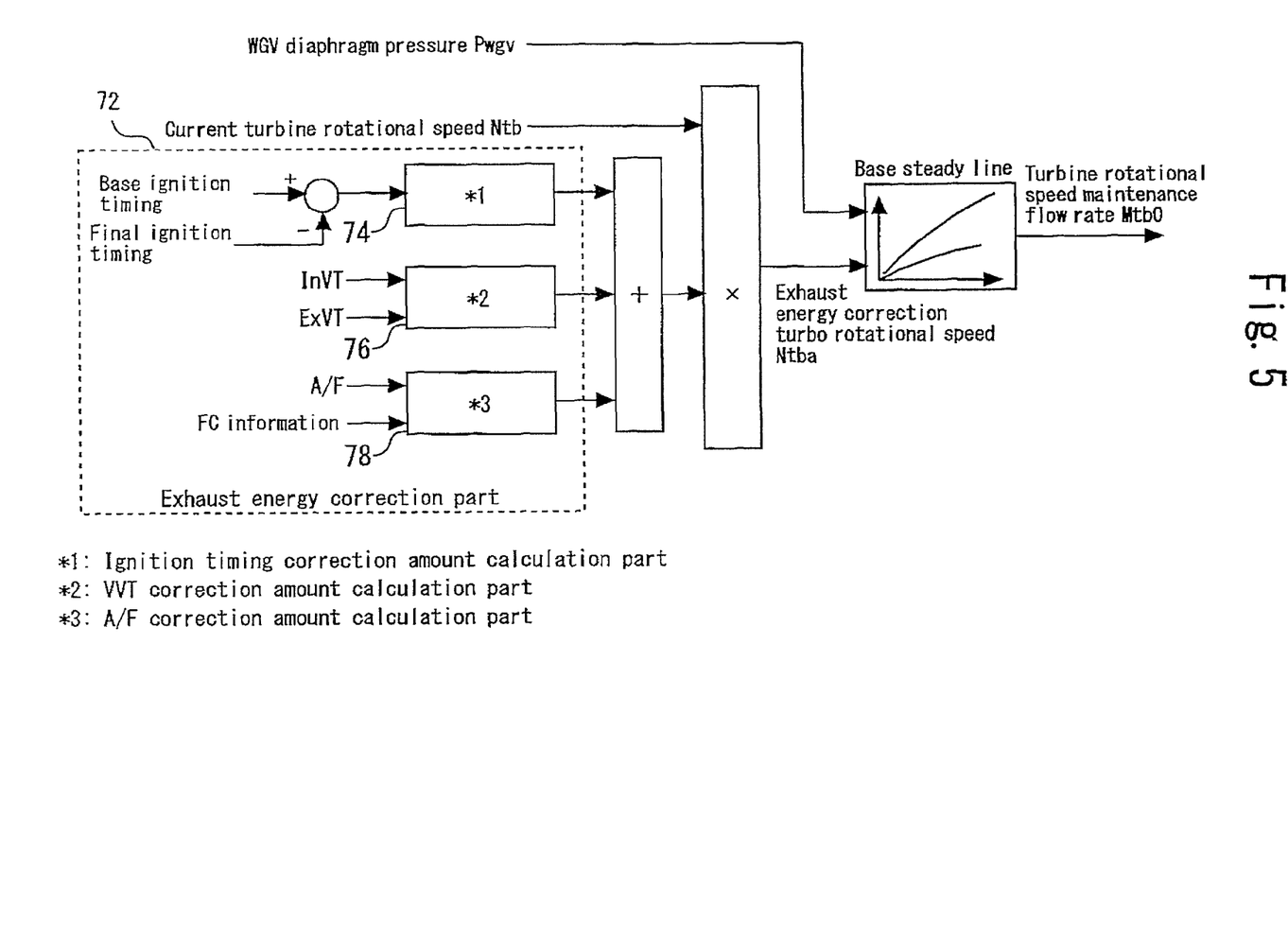
FIG. 5 is a diagram for explaining the flow of calculation of a turbine rotational speed maintenance flow rate Mtb0 by using an exhaust energy correction part of the turbine rotational speed Ntb shown in FIG. 2.

FIG. 5 is a diagram for explaining the flow of calculation of the turbine rotational speed maintenance flow rate Mtb0 by using the exhaust energy correction part 72 of the turbine rotational speed Ntb shown in FIG. 2.

As shown in FIG. 5, the exhaust energy correction part 72 is made up of an ignition timing correction amount calculation part 74 that calculates an ignition timing correction amount, a VVT correction amount calculation part 76 that calculates a VVT (Variable Valve Timing) correction amount, and an A/F correction amount calculation part 78 that calculates an A/F correction amount (including a correction amount based on a fuel cut information).

According to the turbine rotational speed model 70 of the present embodiment, as shown in FIG. 5, the correction amounts calculated by each of the correction amount calculation parts 74, 76 and 78 are added with one another, and then, the current turbine rotational speed Ntb (calculated at the last calculation cycle) is multiplied by the value calculated. As a result of this, the exhaust energy correction turbine rotational speed Ntba that reflects a correction based on the exhaust energy is calculated. Further, the turbine rotational speed maintenance flow rate Mtb0 is calculated by use of the steady line (more specifically, a map that is set in accordance with the tendency of the steady line) that uses the correction turbine rotational speed Ntba and the diaphragm pressure Pwgv as an input.

Next, concrete processing contents of each of the correction amount calculation parts 74, 76 and 78 that are described above will be described.

(As to Ignition Timing Correction Amount Calculation Part)

The ignition timing correction amount calculation part 74 is an element that calculates the ignition timing correction amount in accordance with the difference between the base ignition timing and the final ignition timing.

Figure 6:
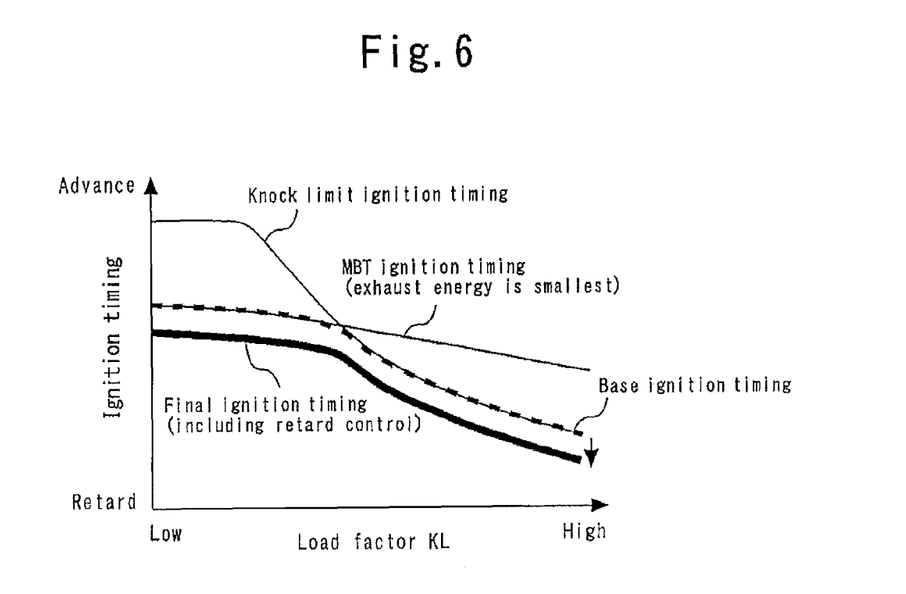
FIG. 6 is a diagram for explaining the setting of a base ignition timing and a relation between the base ignition timing and a final ignition timing.

FIG. 6 is a diagram for explaining the setting of the base ignition timing and a relation between the base ignition timing and the final ignition timing.

The MBT (Minimum advance for the Best Torque) ignition timing shown in FIG. 6 corresponds to a timing as the torque becomes the largest, in other words, as the exhaust energy becomes the minimum. In addition, as shown in FIG. 6, a knock limit ignition timing results in a value on a retard angle side in a high load (high load factor KL) region. Because of this, an ignition timing for obtaining an optimum torque while taking into consideration an avoidance of knock results in a value such as a base ignition timing shown by the broken line in FIG. 6. In the ECU 60, the base ignition timing having the tendency as shown in FIG. 6 is stored as a map with a relation with the load factor KL and the like.

On the other hand, the final ignition timing shown in FIG. 6 is a value when a retard of the ignition timing by means of a retard control is performed for the base ignition timing. In FIG. 6, this retard control is performed temporarily at the time of acceleration, start-up of the engine, or the like, and the ignition timing is corrected to the final ignition timing from the base ignition timing only in the case in which the retard control is performed.

When the aforementioned retard control is performed, the exhaust energy increases as compared with a case in which a control using the base ignition timing is performed. That is to say, a margin for increasing the exhaust energy depends on the retard angle amount from the base ignition timing. Accordingly, according to the ignition timing correction amount calculation part 74, an ignition timing correction amount in accordance with the difference between the base ignition timing and the final ignition timing is calculated. On that basis, as already described, the turbine rotational speed model 70 includes the base steady line using a relation with the base ignition timing, and corrects the turbine rotational speed Ntb on the basis of the ignition timing correction amount calculated by the ignition timing correction amount calculation part 74.

(As to VVT Correction Amount Calculation Part)

The VVT correction amount calculation part 76 is an element that calculates a VVT correction amount of the turbine rotational speed Ntb in accordance with changes in the intake opening and closing timing InVT and the exhaust opening and closing timing ExVT. Here, an intake opening and closing timing InVT that is set so that the intake valve is opened at the exhaust top dead center corresponds to an intake base opening and closing timing InVT0, and an exhaust opening and closing timing ExVT that is set so that the exhaust valve is closed at the exhaust top dead center corresponds to an exhaust base opening and closing timing ExVT0.

When, for example, the valve overlap period is enlarged by advancing the intake opening and closing timing InVT and retarding the exhaust opening and closing timing ExVT under a situation in which the exhaust gas flow rates Mtb are equal, the exhaust energy increases. That is to say, a margin for changing the exhaust energy depends on changes in the intake opening and closing timing InVT and the exhaust opening and closing timing ExVT (or the valve overlap period).

Accordingly, according to the VVT correction amount calculation part 76, the VVT correction amount is calculated on the basis of the change amount of the turbine rotational speed Ntb that is obtained, in advance by experiment or the like, using the relation with the changes in the intake opening and closing timing InVT and the exhaust opening and closing timing ExVT (or the valve overlap period) with respect to the base opening and closing timings InVT0 and ExVT0. On that basis, as already described, the turbine rotational speed model 70 includes the base steady line using a relation with predetermined intake base opening and closing timing InVT0 and exhaust base opening and closing timing ExVT0 for making the valve overlap period zero (or a relation with the minimum value of the valve overlap period), and corrects the turbine rotational speed Ntb on the basis of the VVT correction amount calculated by the VVT correction amount calculation part 76.

(As to A/F Correction Amount Calculation Part)

The A/F correction amount calculation part 78 is an element that calculates the A/F correction amount of the turbine rotational speed Ntb in accordance with a change in the air fuel ratio (A/F) of exhaust gas flowing into the turbine 20b (including a change in the air fuel ratio in association with an execution of a fuel cut).

When the air fuel ratio changes, the exhaust energy changes. That is to say, a margin for changing the exhaust energy depends on a change in the air fuel ratio. Accordingly, according to the A/F correction amount calculation part 78, an A/F correction amount is calculated on the basis of the change amount of the turbine rotational speed Ntb that is obtained, in advance by experiment or the like, using a relation with the change amount of the air fuel ratio with respect to the stoichiometric air fuel ratio. On that basis, as already described, the turbine rotational speed model 70 includes, as the base steady line, the steady line when the air fuel ratio is stoichiometric, and corrects the turbine rotational speed Ntb on the basis of the A/F correction amount calculated by the A/F correction amount calculation part 78.

Figure 7:
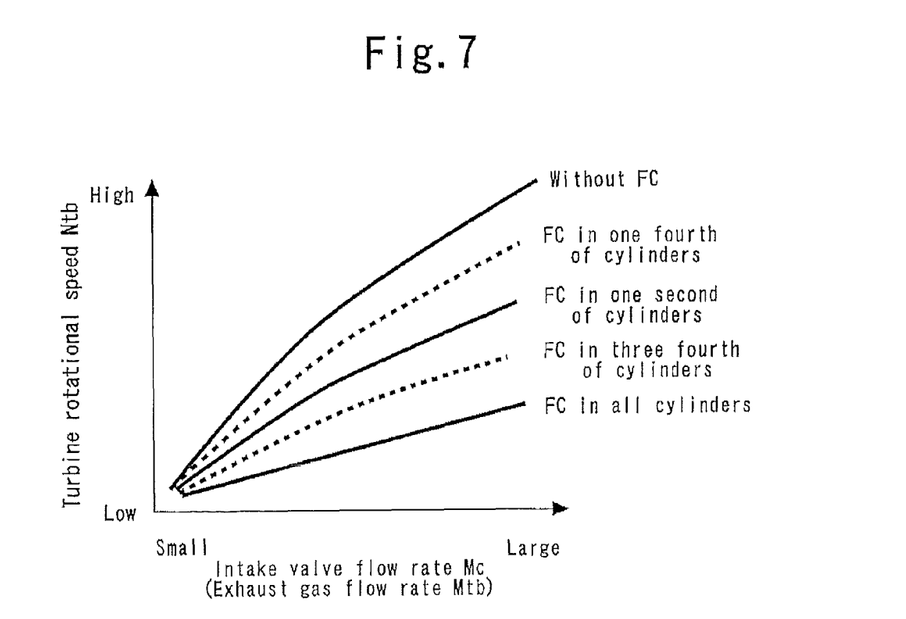
FIG. 7 is a diagram for explaining the influence of the number of cylinders at which a fuel cut is executed, on the steady line that defines a relation at the steady state between the turbine rotational speed Ntb and the intake valve flow rate Mc (exhaust gas flow rate Mtb)

FIG. 7 is a diagram for explaining the influence of the number of cylinders at which a fuel cut is executed, on the steady line that defines a relation at the steady state between the turbine rotational speed Ntb and the intake valve flow rate Mc (exhaust gas flow rate Mtb). FIG. 7 represents a relation under a situation in which the WGV state quantities are equal.

When a fuel cut (FC) is executed, the exhaust energy decreases as compared with a case in which the fuel cut is not executed. Therefore, as shown in FIG. 7, the turbine rotational speed Ntb under a situation in which the intake valve flow rates Mc are equal becomes smaller as the number of cylinders at which a fuel cut is executed increases.

According to the A/F correction amount calculation part 78, the A/F correction amount is calculated on the basis of not only the above described correction in accordance with the air fuel ratio at normal firing operation in which a fuel cut is not executed but also the change amount of the turbine rotational speed Ntb that has been obtained in advance by experiment or the like with a relation with the number of cylinders at which a fuel cut is executed.

Figure 8:
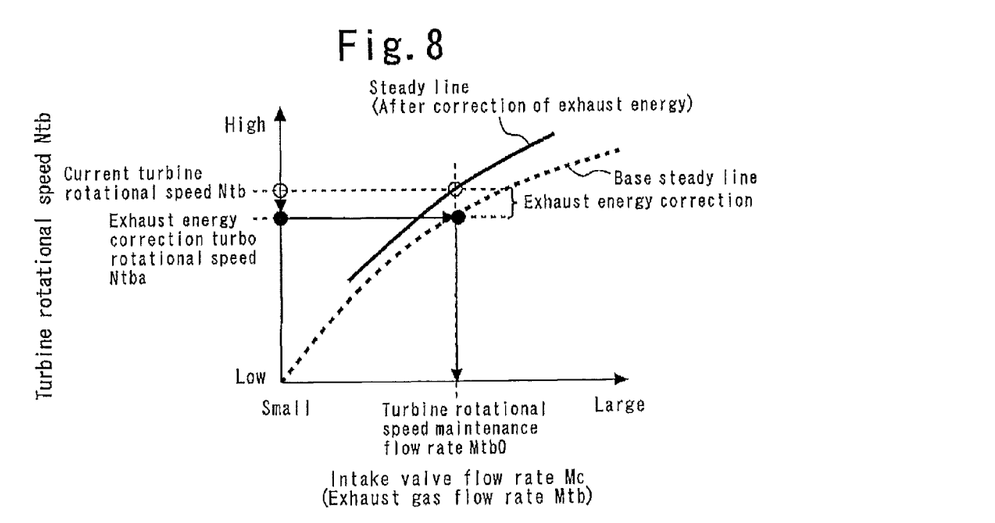
FIG. 8 is a diagram for explaining an effect of the processing of the turbine rotational speed model according to the first embodiment of the present invention.

FIG. 8 is a diagram for explaining an effect of the processing of the turbine rotational speed model 70 according to the first embodiment of the present invention.

According to the processing of the turbine rotational speed model 70 that includes the exhaust energy correction part 72 described so far, the influences of changes in three parameters which are related to a change in the exhaust energy (that is, the ignition timing, the opening and closing timings of the intake and exhaust valves, and the air fuel ratio) are added with one another using three correction amount calculated at the three correction amount calculation parts 74, 76 and 78. On that basis, the exhaust energy correction turbine rotational speed Ntba is calculated by reflecting the influences of the changes of the aforementioned three parameters on the turbine rotational speed Ntb using the three correction amount added with one another. Further, as shown in FIG. 8, the turbine rotational speed maintenance flow rate Mtb0 is calculated by use of this correction turbine rotational speed Ntba and the base steady line (map) in accordance with the WGV state quantity. According to such processing, the turbine rotational speed maintenance flow rate Mtb0 is substantially obtained that corresponds to the current turbine rotational speed Ntb on the steady line (solid line) for which the influence of a change in the exhaust energy is taken into consideration, as shown in FIG. 8.

More specifically, according to the processing of the present embodiment, reflecting the influence of the exhaust energy on the turbine rotational speed Ntb that is used for basis of calculation of the turbine rotational speed maintenance flow rate Mtb0 enables the calculation of the turbine rotational speed maintenance flow rate Mtb0 that has taken into consideration the influences of the exhaust energy and the WGV state quantity, only using a standard map equipped with the ECU 60 (map having the tendency of the base steady line in accordance with the current WGV state quantity) as a map (relation information) that is used for calculation of the turbine rotational speed maintenance flow rate Mtb0. Therefore, according to the processing of the present embodiment, it becomes possible to improve the estimation accuracy of the turbine rotational speed Ntb by the turbine rotational speed model 70, while suppressing an increase in the number of maps and processes to the minimum. Furthermore, by using the turbine rotational speed Ntb calculated by the turbine rotational speed model 70 as basis of calculation of the intake air amount (for example, compressor passing through flow rate), the boost pressure, or the like, the estimation accuracy of the intake air amount, the boost pressure or the like can be improved.

It is noted that in the first embodiment, which has been described above, the ECU 60 calculates the turbine rotational speed Ntb using the turbine rotational speed model 70, whereby the "turbine rotational speed calculation means" according to the first aspect of the present invention is realized, and the ECU 60 calculates the exhaust energy correction turbine rotational speed Ntba using the exhaust energy correction part 72 of the turbine rotational speed model 70, whereby the "rotational speed correction means" according to the first aspect of the present invention is realized.

In addition, in the first embodiment, which has been described above, the steady line (map that is set in accordance with the tendency of the base steady line) equipped with the turbine rotational speed model 70 corresponds to the "relation information" according to the second aspect of the present invention. Further, the ECU 60 estimates the diaphragm pressure Pwgv in accordance with the aforementioned map that is set in advance with the relation with the duty ratio for controlling the VSV 52, whereby the "WGV state quantity obtaining means" according to the second aspect of the present invention is realized, and the ECU 60 calculates the turbine rotational speed maintenance flow rate Mtb0 using the relation of the base steady line, whereby the "rotational speed maintenance flow rate calculation means" according to the second aspect of the present invention is realized.

Furthermore, in the first embodiment, which has been described, the ECU 60 obtains the intake valve flow rate Mc (exhaust gas flow rate Mtb) using the air flow meter 18, whereby the "exhaust gas flow rate obtaining means" according to the third aspect of the present invention is realized, the ECU 60 calculates the turbine flow rate change amount ΔMtb using the turbine rotational speed model 70, whereby the "flow rate change amount calculation means" according to the third aspect of the present invention is realized, and the ECU 60 calculates the turbine rotational speed change amount ΔNtb using the turbine rotational speed model 70, whereby the "rotational speed change amount calculation means" according to the third aspect of the present invention is realized.

Second Embodiment

Next, a second embodiment of the present invention will be described with reference to FIGS. 9 and 10.

Figure 9:
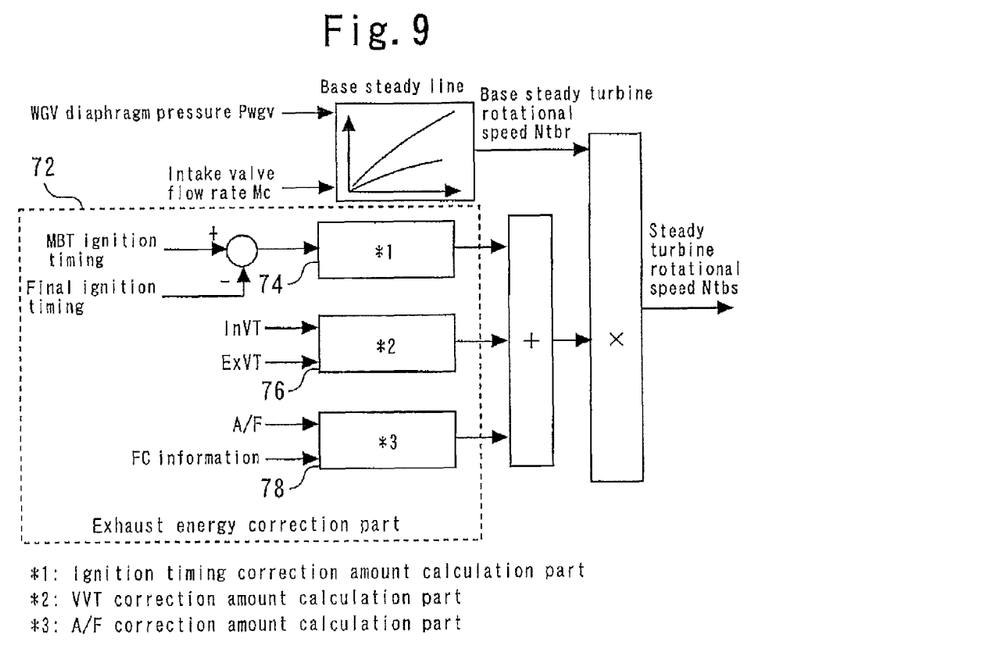
FIG. 9 is a diagram for explaining the flow of calculation of a steady turbine rotational speed Ntbs according to a second embodiment of the present invention.

FIG. 9 is a diagram for explaining the flow of calculation of the steady turbine rotational speed Ntbs according to the second embodiment of the present invention.

According to the system of the present embodiment, the steady turbine rotational speed Ntbs is calculated from the current intake valve flow rate Mc (exhaust gas flow rate Mtb) with the following method, using the hardware configuration shown in FIG. 1.

Specifically, according to the system of the present embodiment, the base steady turbine rotational speed Ntbr is calculated in accordance with the base steady line (map) that defines the steady turbine rotational speed Ntbr at the above described base state on the basis of the relation between the intake valve flow rate Mc (exhaust gas flow rate Mtb) and the diaphragm pressure Pwgv (WGV state quantity), as shown in FIG. 9. In addition, in the system of the present embodiment as well, the exhaust energy correction part 72 that is made up of the ignition timing correction amount calculation part 74, the VVT correction amount calculation part 76 and the A/F correction amount calculation part 78 is included, as in the first embodiment described above.

According to the present embodiment, three correction amounts that are calculated by the aforementioned three correction amount calculation parts 74 and the like are added with one another, and then, multiplied by the base steady turbine rotational speed Ntbr. As a result of this, the steady turbine rotational speed Ntbs after correction concerning the exhaust energy is calculated.

Figure 10:
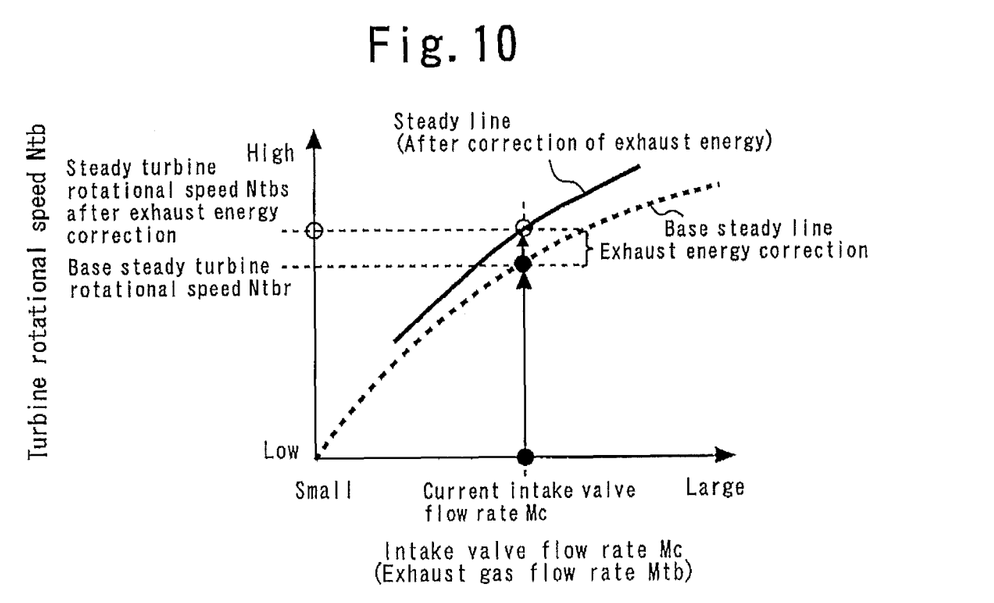
FIG. 10 is a diagram for explaining an effect of the processing of the system according to the second embodiment of the present invention.

FIG. 10 is a diagram for explaining an effect of the processing of the system according to the second embodiment of the present invention.

As described so far, according to the processing of the system in the present embodiment equipped with the exhaust energy correction part 72, the base steady turbine rotational speed Ntbr that is calculated by use of the current intake valve flow rate Mc and the base steady line in accordance with the WGV state quantity is corrected using a correction amount that is calculated by the exhaust energy correction part 72. As a result of this, the steady turbine rotational speed Ntbs is calculated with correction concerning the exhaust energy that reflects the influences of changes in three parameters (that is, the ignition timing, the opening and closing timings of the intake and exhaust valves, and the air fuel ratio) that are related to a change in the exhaust energy. According to such processing, the steady turbine rotational speed Ntbs is substantially obtained that corresponds to the current intake valve flow rate Mc on the steady line (solid line) for which the influence of a change in the exhaust energy is taken into consideration, as shown in FIG. 10.

More specifically, according to the processing of the present embodiment, reflecting the influence of the exhaust energy on the base steady turbine rotational speed Ntbr that is calculated using the base steady line enables the calculation of the steady turbine rotational speed Ntbs that has taken into consideration the influence of the exhaust energy, only using a standard map equipped with the ECU 60 (map having the tendency of the base steady line in accordance with the current WGV state quantity) as a map (relation information) that is used for calculation of the steady turbine rotational speed Ntbs. Therefore, according to the processing of the present embodiment, it becomes possible to improve the estimation accuracy of the steady turbine rotational speed Ntbs, while suppressing an increase in the number of maps and processes to the minimum. Furthermore, by using the steady turbine rotational speed Ntbs calculated as described above as basis of calculation of the intake air amount (for example, compressor passing through flow rate), the boost pressure, or the like, the estimation accuracy of the intake air amount, the boost pressure or the like can be improved.

It is noted that in the second embodiment, which has been described above, the base steady line as shown in FIGS. 9 and 10 (map that is set in accordance with the tendency of the base steady line) corresponds to the "relation information" according to the fourth aspect of the present invention. Further, the ECU 60 obtains the intake valve flow rate Mc (exhaust gas flow rate Mtb) using the air flow meter 18, whereby the "exhaust gas flow rate obtaining means" according to the fourth aspect of the present invention is realized, and the ECU 60 estimates the diaphragm pressure Pwgv in accordance with the aforementioned map that is set in advance with the relation with the duty ratio for controlling the VSV 52, whereby the "WGV state quantity obtaining means" according to the fourth aspect of the present invention is realized.

DESCRIPTION OF SYMBOLS 10 internal combustion engine
12 intake passage
14 exhaust passage
18 air flow meter
20 turbo supercharger
20a compressor
20b turbine
24 throttle valve
26 fuel injection valve
28 ignition plug
30 intake variable valve operating mechanism
32 exhaust variable valve operating mechanism
36 intake cam angle sensor
40 exhaust cam angle sensor
42 exhaust bypass passage
44 waste gate valve (WGV)
46 actuator of WGV
48 negative pressure pump
50 negative pressure passage
52 vacuum switching valve (VSV)
54 catalyst
56 A/F sensor
58 crank angle sensor
60 ECU (Electronic Control Unit)
70 turbine rotational speed model
72 exhaust energy correction part
74 ignition timing correction amount calculation part
76 VVT correction amount calculation part
78 A/F correction amount calculation part

The invention claimed is:

1. A control apparatus for an internal combustion engine, comprising:
a turbo supercharger which includes a turbine in an exhaust passage, the turbine is operated by exhaust energy of an internal combustion engine;
an exhaust bypass passage which bypasses the turbine;
a waste gate valve (WGV) which opens and closes the exhaust bypass passage; and
a controller including an electronic control unit (ECU), the ECU is configured to:
calculate a rotational speed of the turbine;
obtain a WGV opening degree that represents an opening and closing state of the waste gate valve;
correct the rotational speed of the turbine based on at least one of an ignition timing, an opening timing of an intake valve, a closing timing of an intake valve, an opening timing of an exhaust valve, a closing timing of an exhaust valve, and an air fuel ratio,
wherein the ECU further includes:
at least one steady line stored in the ECU as a map which defines, based on a relationship between the rotational speed of the turbine and the WGV opening degree, a rotational speed maintenance flow rate of the turbine necessary for maintaining a current rotational speed of the turbine.

2. A control apparatus for an internal combustion engine, comprising:
a turbo supercharger which includes a turbine in an exhaust passage, the turbine is operated by exhaust energy of an internal combustion engine;
an exhaust bypass passage which bypasses the turbine;
a waste gate valve (WGV) which opens and closes the exhaust bypass passage; and
a controller including an electronic control unit (ECU), the ECU is configured to:
calculate a rotational speed of the turbine;
obtain a diaphragm pressure that represents an opening and closing state of the waste gate valve;
correct the rotational speed of the turbine based on at least one of an ignition timing, an opening timing of an intake valve, a closing timing of an intake valve, an opening timing of an exhaust valve, a closing timing of an exhaust valve, and an air fuel ratio, wherein the ECU further includes:
at least one steady line stored in the ECU as a map which defines, based on a relationship between the rotational speed of the turbine and the diaphragm pressure, a rotational speed maintenance flow rate of the turbine necessary for maintaining a current rotational speed of the turbine and calculates the rotational speed maintenance flow rate of the turbine in accordance with the map, and wherein the electronic control unit (ECU) is configured to correct the rotational speed of the turbine based on the calculated rotational speed maintenance flow rate of the turbine.

3. The control apparatus for an internal combustion engine according to claim 2, wherein the electronic control unit (ECU) is further configured to:
obtain a flow rate of exhaust gas discharged from a cylinder of the internal combustion engine;
calculate a flow rate change amount of the turbine that is a difference between the exhaust gas flow rate and the rotational speed maintenance flow rate of the turbine; and
calculate a rotational speed change amount of the turbine that is a change amount of the rotational speed of the turbine based on the flow rate change amount of the turbine calculated by the electronic control unit (ECU),
wherein the electronic control unit (ECU) calculates the current rotational speed of the turbine based on the current rotational speed change amount of the turbine calculated by the electronic control unit (ECU) and a previously calculated rotational speed of the turbine.

4. The control apparatus for an internal combustion engine according to claim 2,
wherein the waste gate valve (WGV) is a valve which opens and closes by a diaphragm pressure acting on a diaphragm that operates simultaneously with the waste gate valve (WGV).

* * * * *